(12) United States Patent
Benza et al.

(10) Patent No.: US 12,214,544 B2
(45) Date of Patent: Feb. 4, 2025

(54) IN SITU CHEMICAL MODIFICATION DURING ADDITIVE MANUFACTURING

(71) Applicant: BATTELLE SAVANNAH RIVER ALLIANCE, LLC, Aiken, SC (US)

(72) Inventors: Donald Benza, Aiken, SC (US); Aaron Washington, Martinez, GA (US); Jonathan Baker, Aiken, SC (US); Camden A. Chatham, Aiken, SC (US); Adrian Mistreanu, Wilmington, NC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 0 days.

(21) Appl. No.: 17/869,451

(22) Filed: Jul. 20, 2022

(65) Prior Publication Data

US 2024/0025108 A1 Jan. 25, 2024

(51) Int. Cl.
| | |
|---|---|
| *B29C 64/00* | (2017.01) |
| *B29C 64/118* | (2017.01) |
| *B29C 64/209* | (2017.01) |
| *B29C 64/268* | (2017.01) |
| *B29C 64/364* | (2017.01) |
| *B33Y 10/00* | (2015.01) |
| *B33Y 30/00* | (2015.01) |
| *B33Y 40/00* | (2020.01) |
| *B33Y 80/00* | (2015.01) |

(52) U.S. Cl.
CPC .......... *B29C 64/118* (2017.08); *B29C 64/209* (2017.08); *B29C 64/268* (2017.08); *B29C 64/364* (2017.08); *B33Y 10/00* (2014.12); *B33Y 30/00* (2014.12); *B33Y 40/00* (2014.12); *B33Y 80/00* (2014.12)

(58) Field of Classification Search
CPC .......................... B29C 64/364; B29C 64/371
See application file for complete search history.

(56) References Cited

U.S. PATENT DOCUMENTS

| | | | |
|---|---|---|---|
| 9,408,297 B2 | 8/2016 | Srinivas et al. | |
| 10,507,638 B2* | 12/2019 | Nuechterlein | .......... B22F 10/32 |
| 10,995,406 B2 | 5/2021 | Gandhiraman et al. | |
| 11,141,809 B2 | 10/2021 | Nelson et al. | |

(Continued)

FOREIGN PATENT DOCUMENTS

JP 6730387 B2 3/2017

OTHER PUBLICATIONS

Wikipedia, Atmospheric pressure, Jun. 10, 2017, Wikipedia, https://en.wikipedia.org/w/index.php?title=Atmospheric_pressure&oldid=784944802. (Year: 2017).*

(Continued)

*Primary Examiner* — Nicholas R Krasnow
(74) *Attorney, Agent, or Firm* — Dority & Manning, P.A.

(57) ABSTRACT

Additive manufacturing methods and systems are disclosed for chemical modification of a build material through at least 300 nm of the depth of each deposited layer. The depth of penetration of chemical modification is brought about through formation parameters including increased pressure, decreased humidity, formation temperatures, etc. Formed build product properties are improved as compared to those formed by traditional bulk manufacturing methods as well as to those formed by previously known additive manufacturing methods.

20 Claims, 4 Drawing Sheets

(56) References Cited

U.S. PATENT DOCUMENTS

| | | | |
|---|---|---|---|
| 11,148,409 | B2 | 10/2021 | Mark et al. |
| 2017/0182558 | A1* | 6/2017 | Shimizu ................. B33Y 30/00 |
| 2017/0341142 | A1 | 11/2017 | Ackelid |
| 2018/0001557 | A1* | 1/2018 | Buller ................... B33Y 50/02 |
| 2018/0065209 | A1 | 3/2018 | Foret |
| 2018/0207863 | A1 | 7/2018 | Porter et al. |
| 2018/0281284 | A1* | 10/2018 | Elgar ................... B29C 64/371 |
| 2019/0106593 | A1 | 4/2019 | Kenney et al. |
| 2019/0264049 | A1 | 8/2019 | Atashbar et al. |
| 2019/0329322 | A1 | 10/2019 | Preston et al. |
| 2020/0230746 | A1* | 7/2020 | Jin ....................... B23K 26/354 |
| 2020/0316685 | A1 | 10/2020 | Yalamanchili |
| 2022/0044870 | A1 | 2/2022 | Yahata et al. |

OTHER PUBLICATIONS

International Civil Aviation Organization. Manual of the ICAO Standard Atmosphere, Doc 7488-CD, Third Edition, 1993. ISBN 92-9194-004-6. (Year: 1993).*

Shih, C.C., 2019. Effects of cold plasma treatment on interlayer bonding strength in fused filament fabrication (FFF) process (Doctoral dissertation). (Year: 2019).*

Levenhagen, N.P. and Dadmun, M.D., 2019. Reactive processing in extrusion-based 3D printing to improve isotropy and mechanical properties. Macromolecules, 52(17), pp. 6495-6501. (Year: 2019).*

Lederle, F., Meyer, F., Brunotte, G.P., Kaldun, C. and Hübner, E.G., 2016. Improved mechanical properties of 3D-printed parts by fused deposition modeling processed under the exclusion of oxygen. Progress in Additive Manufacturing, 1, pp. 3-7. (Year: 2016).*

Shaik, Y.P., Schuster, J., Katherapalli, H.R. and Shaik, A., 2022. 3D printing under high ambient pressures and improvement of mechanical properties of printed parts. Journal of Composites Science, 6(1), p. 16. (Year: 2022).*

Mikes et al., "3D printing materials for generators of active particles based on electrical discharges", Plasma Processes and Polymers, 2020; 17; 14 pages.

International Search Report and Written Opinion for PCT/US2023/027958, dated Oct. 20, 2023, 8 pages.

\* cited by examiner

IN SITU CHEMICAL MODIFICATION DURING ADDITIVE MANUFACTURING

FEDERAL RESEARCH STATEMENT

This invention was made with Government support under Contract No. 893033210EM000080, awarded by the Department of Energy. The Government has certain rights in the invention.

BACKGROUND

Traditional manufacturing processes such as injection molding or CNC techniques prevent or make it extremely difficult to alter the materials of formation (polymers, metals, ceramics, etc.) in situ. Rather, in traditional processing, material enhancements are limited to pre- and post-processing manipulations such as inclusion of additives, heat treatments, and post-formation surface modifications.

Additive manufacturing technologies are distinguished from traditional formation processes by a layer-by-layer fabrication paradigm. This paradigm enables design flexibility and agility but often leads to significantly different final part properties compared to traditional bulk manufacturing methods formed of the same materials. Additive manufacturing techniques allow for direct access to a higher percentage of formation material than traditional bulk manufacturing techniques as a large amount of the formation material is exposed at some point during manufacture. This has provided opportunities to adapt surface modification techniques into the layer-by-layer fabrication techniques and affect a larger percentage of the part as compared to surface modification of the final product formed by traditional methods. Typical example surface modifying techniques include applying liquids, gasses, and electromagnetic radiation to the surface of each layer during formation.

As additive manufacturing and supporting technologies have advanced, the seven technology families identified by ASTM/ISO 52900 D (vat photopolymerization, material jetting, binder jetting, material extrusion, powder bed fusion, sheet lamination, and direct energy deposition) have been improved by methods such as surface modifying techniques to provide improved manufacturing and performance property benefits.

While the above describes improvement to the art, room for further improvement exists. For instance, additive manufacturing formation methods that can provide for chemical modification of the formation materials through the depth of the deposited materials could provide great benefit to the art. Such methods could provide structures formed via additive manufacturing technologies with improved characteristics.

SUMMARY

According to one embodiment, disclosed is an additive manufacturing system that includes a deposition nozzle in a deposition chamber. The system also includes a source for delivery of a reactive agent to the deposition chamber. The source can deliver a reactive agent in the form of a chemical reactive agent and/or of energy. The system also includes a control system for control of the pressure and, optionally, other characteristics within the deposition chamber such as temperature, humidity, deposition rate of a build material, etc.

According to one embodiment, disclosed is an additive manufacturing method that includes depositing a build material to form a first layer having a layer depth. The deposition takes place in an atmosphere that includes an increased pressure and, optionally, a decreased relative humidity. The method also includes contacting the first layer with a reactive agent in the atmosphere. Upon the contact, the reactive agent causes a modification in the chemical structure of a polymer of the build material. The modification is carried out at and beneath the surface of the first layer to a depth of about 300 nanometers (nm) or more of the layer.

Also disclosed are build products formed by use of the methods and systems. A build product can exhibit a chemical modification to a polymer of the build material. The chemical modification can be present across 300 nm or more of a depth of the build product, the depth corresponding to the depth of a layer formed during additive manufacture of the build product. The chemical modification can be present across only a portion of the depth (i.e., present as a gradient within the product), or alternatively, across the entire depth. A build product can exhibit one or more characteristics that differ as compared to a similar build product formed of the same build but absent the increased pressure and optional humidity characteristics of the build atmosphere.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

DETAILED DESCRIPTION

Figure 1:
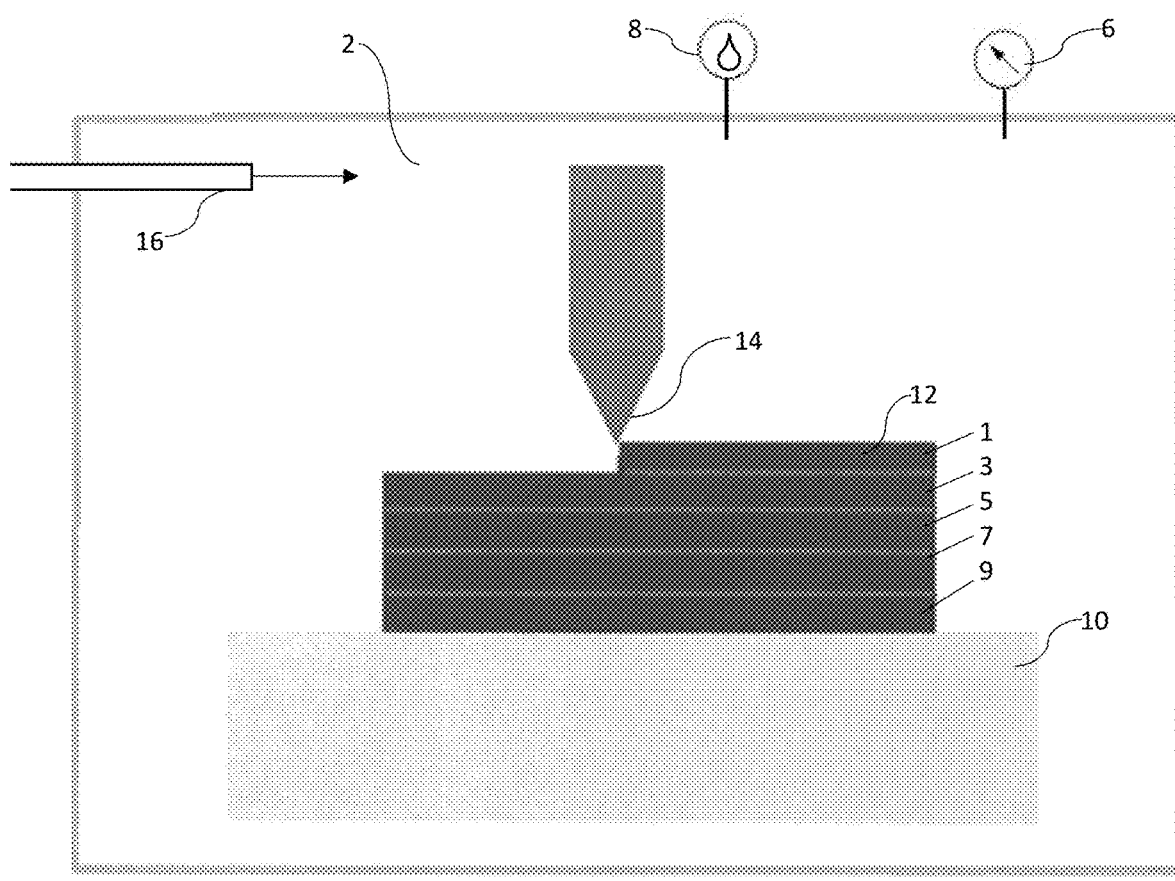
FIG. 1 schematically illustrates one embodiment of an additive manufacturing formation method as disclosed herein.

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, the present disclosure is directed to methods and systems that leverage the layer-by-layer additive manufacturing process to improve manufacturing processes and/or final part performance characteristics. More specifically, disclosed additive manufacturing formation methods and systems provide a route for alteration of the chemical structure of a build material and thereby alteration of one or more properties of the material. By the methods and systems, the chemical alteration of a build material can be carried out with an increased depth of penetration as compared to previously known surface modification techniques. The increased effective depth of penetration of chemical modification represents a larger proportion of total part volume resulting in an increased effectiveness for altering a build material as compared to those formed by traditional bulk manufacturing methods, as well as to those formed by previously known additive manufacturing methods.

Chemical alteration to a build material can provide improvement in manufacturing processing and/or improvement to a final build product. This technology has broad application to many industries and can bring about the next generation of additive manufactured materials through development of improved material properties. Improvements as may be brought about through this technology can provide a route for making build materials more versatile and valuable. By way of example, disclosed technology can provide for development of high-performance build materials from polymers that have been previously considered as commodity materials but did not exhibit desired performance characteristics when processed according to traditional additive manufacturing technologies. Improved performance characteristics may include, but are not limited to, improved processing characteristics, mechanical characteristics, temperature resistance, chemical resistance, and radiation resistance, as well as improvement to any combination of multiple performance characteristics.

Additive manufacturing refers to any method for forming a three-dimensional (3D) object in which materials are deposited systematically according to a controlled deposition and/or solidification process. The main differences between additive manufacturing processes are the types of materials to be deposited and the way the materials are deposited and solidified. Additive manufacturing methods utilized herein include those that can deposit materials including liquids (e.g., melts, viscous liquids, or gels) and solids (e.g., suspensions, powders, sheets) to produce a layer followed by spontaneous or controlled curing of the deposited material, with each successive layer becoming adhered to the previous layer during the solidification process.

In general, any layer-by-layer additive manufacturing process can be utilized in conjunction with disclosed methods and systems for formation of any manufactured part. Additive manufacturing processes encompassed herein can differ from one another with regard to the composition and phase of the build material used to form individual layers, as well as with regard to the method utilized to deposit and/or solidify the layer/structure. Exemplary manufacturing processes encompassed can include, without limitation, fused filament fabrication (FFF), direct ink writing (DIW), fused deposition modeling (FDM), selective laser sintering (SLS), stereo lithographing (SLA), or any other layer-by-layer 3D printing (3DP) methodology.

Disclosed methods can be utilized with additive manufacturing processes such as, but not limited to, SLA or FFF that deposit the build material as a liquid (e.g., a melt, a gel, or a highly viscous liquid), as well as with additive manufacturing processes such as, but not limited to, SLS, selective laser melting (SLM), electron beam melting (EBM), multi jet fusion (MJF), binder jetting (BJT), material jetting (MJ), and laminated object manufacturing (LOM) that deposit the build material in a solid phase (e.g., as a suspension, powder, or sheet).

As illustrated in FIG. 1, in some embodiments, a build material 12 can be deposited from a nozzle 14 to a print bed 10 in the form of a gel, a suspension, melt, powder, or suitably high viscosity liquid that can be extruded in a plurality of layers 1, 3, 7, 9. In some embodiments, a polymer melt can be deposited via extrusion as a layer 9 in a desired pattern and the extrudate can then be cured through, e.g., a change in temperature (e.g., spontaneously upon deposition) or via active instigation (e.g., a UV or otherwise actively initiated curing mechanism) of the entire layer or only select portions of the layer. Following, another layer 7 of the extrudate can be applied, followed by cure, and so on through additional layers 5, 3, 1 to build the entire 3D structure. Alternatively, successive layers of the extrudate can be built up and the entire structure can be cured in a single process.

In one embodiment, a build material 12 can be a polymeric composition, e.g., a melt, solution, gel, or suspension that includes at least one polymer that can form a polymeric matrix of a build product (also referred to herein as a matrix polymer), optionally in conjunction with one or more additional polymers and/or one or more additional non-polymeric components. Additional polymers of a build material 12 can include additional matrix polymers as well as non-matrix polymers, e.g., polymers present in the composition in the form of particulate additives.

Polymers as may be included in a polymeric composition are not particularly limited and can include, without limitation, thermoplastic or thermoset polymers such as polyolefins (e.g., high density polyethylene (HDPE), polypropylene), polystyrenes, polyurethanes, polyethylene terephthalates (PET), acrylonitrile butadiene styrenes (ABS), glycolyzed polyesters (PETG), polycarbonates (PC), polyamides (e.g., nylon), polyetherketones (e.g., PEEK, PEKK, polyaryletherketones, polyetherimides), biodegradable polymers (e.g., polylactide (PLA)), polyphenylsulfones (e.g., PPSU, PPSF), halogenated polymers (e.g., PTFE, PVC), elastomeric thermoplastics, etc., as well as combinations thereof.

In one embodiment, a build material can include multiple materials that can be deposited to a build surface from multiple deposition nozzles. For instance, a first material can be deposited from a first deposition head via a first nozzle and a second material can be deposited from a second deposition head via a second nozzle. Of course, additional materials can be deposited from additional deposition heads via additional nozzles and a system is not limited to one or two deposition nozzles. When combining several materials that are separately deposited, the materials can differ from one another with regard to one or more components. For instance, different materials can include completely different components or can include one or more components in common. By way of example, a first material can include a first polymer and a second material can include a second, different polymer, optionally in conjunction with the first polymer. In another example, different materials can include the same components but can differ with regard to relative proportions of the components. In yet another example, different materials can differ with regard to a non-polymeric component, e.g., a first material includes a first polymer, and a second material includes a non-polymeric component that exhibits reactivity to the first polymer (e.g., a crosslinking agent, a functional monomeric reactant, etc.), optionally in conjunction with the first polymer, a second, different polymer or no polymeric component.

In those embodiments in which multiple materials are deposited from multiple deposition nozzles to provide a build material, different materials can be deposited either simultaneously or consecutively (or any combination thereof) in an adjacent fashion, with first and second materials contacting one another following deposition. Adjacent deposition can encompass both interlayer and intralayer adjacent deposition. In such an embodiment, chemical modification as disclosed herein can affect a polymer of one or more of the build materials. In some embodiments, a chemical modification can affect a blended mixture of the two materials that is formed along the adjacent deposition, optionally in conjunction with chemical modification of one or both of the materials in areas in which they have not mixed to form a blend.

In one embodiment, a build material can include a biodegradable polymer, such as a PLA, poly(lactide-co-glycolide), polycaprolactone, etc., or combinations thereof. Disclosed methods and systems can prove particularly useful in such embodiments due to the ecological benefits of utilizing biodegradable polymers. Enhancement of the polymer structure through use of disclosed methods and systems can enable the formation of a build product having physical characteristics similar to those formed of more expensive and nondegradable polymers, such as ABS. Replacement of nondegradable high performance polymers in commercial applications with less expensive biodegradable materials can provide both monetary and environmental advantages.

A build material 12 can optionally include components in addition to one or more polymers such as, for instance, a solvent, a viscosity modifier, a surface tension modifier, a particulate additive, a catalyst, a compatibilizer, etc.

A solvent can be an aqueous solvent or an organic solvent. In some embodiments, an aqueous solvent can be utilized, while in others, a binary solvent system or an organic solvent may be selected. Typical solvents can include, without limitation, water, ethanol, dichloromethane, acetone, furfuryl alcohol, dimethyl formamide, formic acid, acetic acid, tetrahydrofuran, and mixtures thereof. When present, a solvent can generally be included in a polymer composition in an amount of from about 0.1 wt. % to about 10 wt. % (e.g., about 0.1 wt. % to about 5 wt. %).

Examples of suitable viscosity modifiers include (and are not limited to) glycols (e.g., ethylene glycol, propylene glycol), ethers (e.g., ethylene glycol methyl ether), alcohols (e.g., 1-propanol), esters (ethyl lactate), ketones (e.g., methyl ethyl ketone (MEK)) and organo-sulphur compounds (e.g., sulfolane). When present, a viscosity modifier can be included in a polymer composition in an amount of from about 0.1 wt. % to about 50 wt. % (e.g., about 0.1 wt. % to about 5 wt. %).

A surface tension modifier is suitably a water-soluble surface-active material that can, in one embodiment, be advantageous as a processing aid. Examples of suitable materials include surfactants, generally non-ionic surfactants such as (and without limitation to) Triton®, Tween®, poloxamers, cetostearyl alcohol, cetyl alcohol, cocamide DEA, monolaurin, Nonidet® P-40, nonoxynols, decyl glucoside, pentaethylene glycol monododecyl ether, lauryl glucoside, oleyl alcohol, and polysorbate. When present, a surface tension modifier can be in the polymer composition at an amount of from about 0.01 wt. % to about 2 wt. %.

In some embodiments, a polymer composition can include a particulate additive, for instance, a carbon or inorganic particulate additive (e.g., graphene, carbon nanotubes, metals, ceramic, etc.) or polymeric particulate additive, for instance, in the formation of a printable ink. Polymeric particulate additives can include those formed of a polymer blend or a polymer alloy and can generally be formed of a polymer that differs from a polymer of a build product matrix. By way of example, in one embodiment, a polymeric particulate additive can include an elastomeric polymer, e.g., as an impact modifier.

In some embodiments, the build material can include a dispersant or compatibilizer that can encourage dispersion of components in the composition, e.g., encourage dispersion and compatibilization of a particulate within a polymeric matrix and/or dispersion of two polymers within one another. A dispersant can include, in one embodiment, a polycyclic aromatic compound. For instance, a dispersant can include a ring system that includes from 2 to 10 fused benzene rings, the ring system being substituted with from 1 to 4 independently selected hydrophilic groups, each hydrophilic group including less than 20 atoms that may be independently selected from S, O, P, H, C, N, B and I. Exemplary hydrophilic groups include $SO_3H$, $SO_2H$, $B(OH)_2$, $CO_2H$, $OH$ and $PO^3H$. Generally, when the polyaromatic compound comprises multiple substituent groups, they are not all the same. The polycyclic aromatic compound may be a salt, e.g., a base addition salt. Common compatibilizer compounds include organosilanes having the general formula $R_1$—Si—$(R_2)_3$ in which $R_1$ is a sulfide group, e.g., an alkyl sulfide, an alkenyl sulfide, optionally containing an amino group, and $R_2$ is an alkoxy group. When present, the amount of a dispersant/compatibilizer present in an ink can be from about $10^{-4}$ mol/L to about $200 \times 10^{-4}$ mol/L.

As illustrated in FIG. 1, a system can include a deposition chamber 2 that can contain a print bed 10 and a nozzle 14. A deposition chamber 2 can be sealable from the surrounding environment, in some embodiments. However, this is not a requirement of a system and in other embodiments, a deposition chamber need not be hermetically sealed from the surrounding atmosphere during use.

A system can also include a source such as an inlet 16 that can be utilized to deliver a reactive agent, e.g., a reactive gas, to the deposition chamber 2 that can contact the build material 12 during and following deposition of the build material 12 to the print bed 10. A reactive gas as may be delivered to a deposition chamber 2 via an inlet 16 can include a reactant selected for reaction with a polymer or another component of the build material 12 so as to cause a chemical modification to the polymer. Exemplary gas phase reactants can include, without limitation, ozone, ammonia, nitrogen, hydrogen, sulfur dioxide, phosphine, chlorine, fluorine, acyl chloride, carbon disulfide, and ethylene gas, as well as combinations of chemical reactants.

Figure 2:
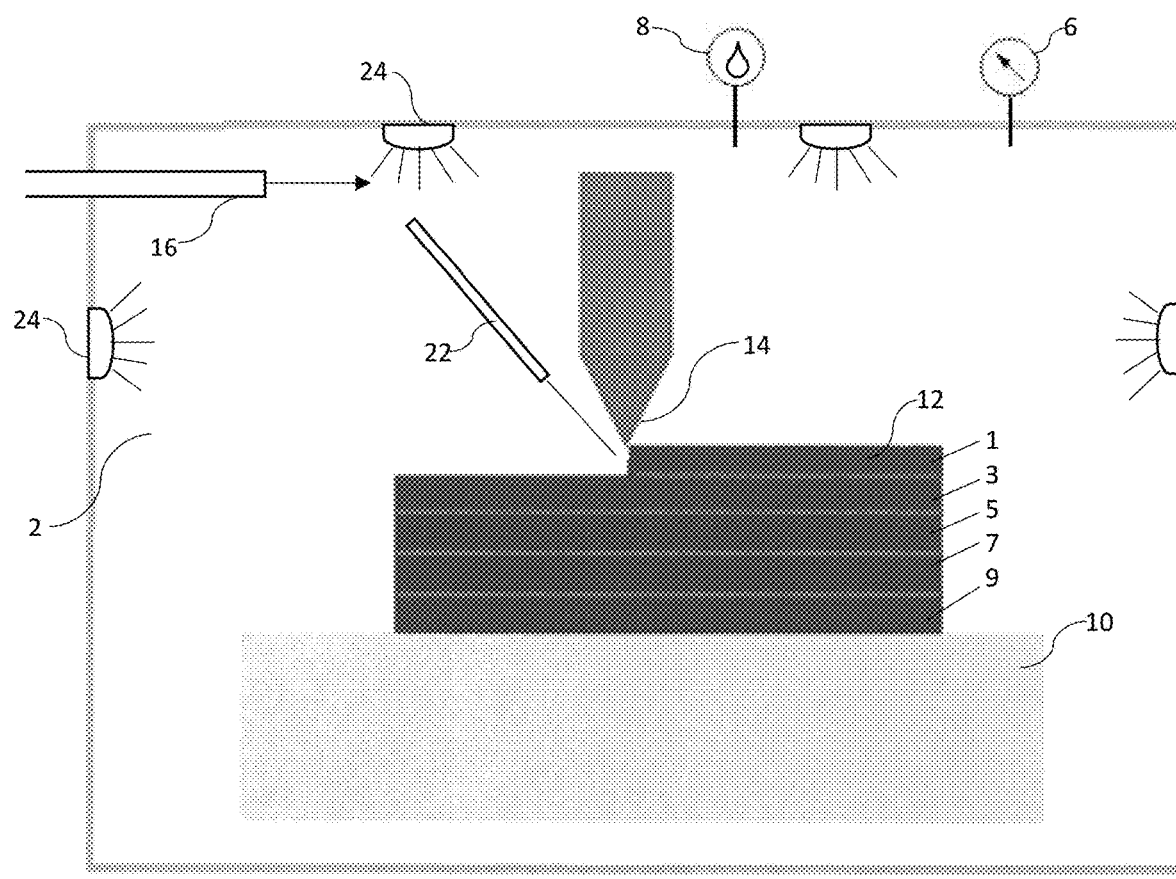
FIG. 2 schematically illustrates one embodiment of an additive manufacturing formation method as disclosed herein.

In another embodiment, illustrated in FIG. 2, a reactive agent to be delivered to a build material 12 can include energy, e.g., energy in the form of an electron beam, electromagnetic energy of a predetermined wavelength. For instance, a system can include a device 22 such as an electron gun, an x-ray emitter, a microwave emitter, a magnetic induction system, or a laser for delivery of a focused beam of energy. In one embodiment, a device 22 can deliver the focused beam at or near (e.g., within about 1 inch) of the opening of the nozzle 14 and/or the deposition point of the build material. In one embodiment, a system can include one or more devices 24 for a more diffuse delivery of electromagnetic energy. In some embodiments, a system can include a combination of a focused energy device 22 and one or more diffuse energy devices 24. When incorporated in a system as a reactive agent, energy can excite one or more components of the build material, a chemical reactive agent, or both to create a more energetically favorable situation for reactions to occur at depth in the build material. The introduction of energy as a reactive agent can assist in overcoming energy threshold barriers which can allow new reactions to occur and/or increase the rate of reactions that would eventually occur absent the introduction of the energy.

Electromagnetic energy delivered to the build material 12 can include only a single wavelength or can include a spectrum of wavelengths, as desired. For instance, in the case of a focused beam delivery device 22, electromagnetic energy to be delivered can be of a single wavelength, while in the case of a diffuse delivery device 24, the energy to be delivered can be a broader spectrum. Energy to be delivered as a reactive agent can be within any desired spectrum, including, without limitation, the microwave, infrared, visible, ultraviolet or x-ray spectrum, such as from about 1 m to about 10 pm, such as from about 1 mm to about 1 m (e.g., in the microwave spectrum), such as from about 1 mm to about 1 cm (e.g., an extremely high microwave frequency), such as from about 1 cm to about 100 cm (e.g., a super high microwave frequency), such as from about 100 cm to about 1 m (e.g., an ultra-high microwave frequency), such as from about 1 μm to about 1 cm (e.g., in the infrared spectrum), such as from about 1 μm to about 10 μm (e.g., a near infrared frequency), such as from about 10 μm to about 100 μm (e.g., a mid-infrared frequency, such as from about 100 μm to about 1 mm (e.g., a far infrared frequency), such as from about 100 nm to about 1 μm (e.g., a near ultraviolet through visible frequency), such as from about 1 nm to about 100 nm (e.g., an extreme ultraviolet frequency), such as from about 10 μm to about 1 nm (e.g., an x-ray frequency).

As illustrated in FIG. 2, a system can be designed to deliver multiple reactive agents to a build material 12 including one or more chemical reactive agents via an inlet 16 and reactive energy via a focused device 22 and/or a diffuse device 24. However, in other embodiments, a system can deliver only chemical reactive agent(s) or only energy as the reactive agent.

The introduction of one or more reactive agents can allow for reactions between the agent and a polymer of the build material or other components of the environment (e.g., other components of the build material) which can result in controlled and deliberate chemical modifications of a polymer of the build material leading to property changes in the composition and/or the resulting product.

The reactive agent(s) can modify a polymer of a build material 12. In some embodiments, the modification can include modification of one or more functional groups along a polymer backbone and/or chemical modifications of pendant groups that extend from a polymer backbone through reaction of a polymer with a chemical reactive agent. Chemical modifications can include, and without limitation to, formation of hydroxyl, peroxide, hydroperoxide, aldehyde, carboxyl, amines, amides, halogenated, and methoxy groups. For instance, a carbonyl group can be modified to form a carboxyl group, an ester group can be modified to form a peroxide group, a methyl group can be modified to form a methanol, etc.

Chemical modifications can include formation or destruction of bonds, which can be covalent or non-covalent in nature. For instance, in one embodiment, chemical bonds/associations can be formed that are non-covalent but fit the category of hydrogen bonds or Van der Waals associations. In such an embodiment, a modification to the build material can include the formation of a "supra-molecular complex" in the build material, i.e., a complex of a plurality of build material molecules held together through non-covalent interactions.

Chemical modification of a polymer can include bond formation between a polymer and a chemical reactive agent and/or another component of a build material. For instance, a polymer can be crosslinked upon interaction with a reactive agent. In such embodiments, a polymer can crosslink with itself and/or with another component of a build material, such as another polymer and/or a particulate of the build material. Crosslinking can be carried through addition of energy to the system alone or, alternatively, through addition of a chemical reactive agent, e.g., a crosslinking agent, optionally, in conjunction with the addition of energy as a secondary reactive agent. In one embodiment, contact with a reactive agent can lead to formation of a radical on the polymer chain which can then encourage reaction of the polymer with itself (e.g., crosslink formation) and/or with another component of the build material.

Chemical modification of a polymer can also include bond breakage. For instance, a reaction product can destabilize a polymer through formation of a destabilizing chemical group on the polymer, through formation of a radical on the polymer, etc., leading to bond breakage either along the polymer backbone or on a pendant group of the polymer.

In one embodiment, a build material can include two polymers, at least one of which is a matrix polymer, and upon introduction of the reactive agent(s), one or both of the polymers can be modified. Moreover, all or only a portion of the polymer content present in an effected area of a build material can be modified. The modified polymer(s) can interact as a result of the chemical modification. For instance, all or only a portion of a modified first polymer can interact (e.g., crosslink) with all or only a portion of a second polymer which can, in some embodiments, also be modified. A resulting product can thus include both the modified and unmodified polymer(s), as well as one or more interaction products of the compounds within the depth of the layer that exhibits the chemical modification.

A chemical modification of a build material can alter one or more characteristics of a build material so as to provide benefit during the manufacturing process, to the final build product, or both. For instance, modifications to a build material due to a chemical modification to a polymer contained therein can include, without limitation, changes in surface energy, dispersion domain size, interfacial strength, small molecule transport selectivity, macroscopic scale optical appearance (e.g., color, fluorescence, etc.), scent, etc.

A system can include a control system for controlling parameters of a formation process including, and without limitation to, temperature within the deposition area (e.g., within the chamber 2), temperature of the print bed 10, temperature of the nozzle 14, flow characteristics of a build material 12 through the nozzle 14, flow or emission of a reactive agent into the chamber 2, pressure (as represented by gauge 6) within the chamber 2, and optionally, humidity (as represented by gauge 8) within the chamber.

Through design and control of the formation parameters within a deposition chamber 2, a reactive agent can penetrate beneath the surface of an individual layer 1, 3, 5, etc. of a build material 12 during a formation process. This allows for bulk chemical manipulations of polymer within the build material 12 and at a depth within each layer. For instance, a polymer of a build material 12 can be modified through less than the entire depth of a layer to provide a chemical gradation through the layer depth.

In some embodiments, a polymer of a build material can be modified at the surface of each layer and to a depth below the surface of about 300 nm or more, such as about 350 nm or more, such as about 400 nm or more, such as about 500 nm or more, such as about 550 nm or more, such as about 600 nm or more, such as about 650 nm or more, such as about 700 nm or more, such as about 750 nm or more, such as about 800 nm or more, such as about 850 nm or more, such as about 900 nm or more, such as about 950 nm or more, such as about 1 mm or more, such as about 1.5 mm or more. In some embodiments, the chemical modification of a polymer can extend through the entire depth of a single layer.

Successive stacking of the modified layers can provide a final build part that has been modified within the depth of the layers of the final part, and in one embodiment, throughout the entire depth of the layers of the final part. In those embodiments in which the modification does not extend completely through each layer, a final build product can exhibit a gradation of the modification through the product. The gradation pattern can mirror that of each layer. As such, the final build product can include identifiable chemical gradients through the depth of a build piece that extend beyond the surfaces of the individual layers formed during the manufacture of the build part.

Increased pressure within the chamber 2 during deposition and cure of the build material 12 can encourage increased penetration depth of a chemical reactive agent and resulting polymer modification as well as more homogenously dispersed reactions throughout the build material 12. A pressure increase of a chemical reactive agent can represent a concentration increase that can lead to more reactions in a given unit of time. Thus, increased pressure in a chamber 2 can increase both the rate of reaction and the penetration depth in which reactions occur, which can also decrease the formation time. In one embodiment, pressure of a deposition chamber 2 can be increased over that of the surrounding atmospheric pressure. For instance, pressure within a deposition chamber 2 can be increased over that of the surrounding atmosphere by about 7 kPa or more over the course of a formation process. For instance, the absolute pressure within a deposition chamber can range from about 110 kPa to about 600 kPa (i.e., gauge pressure from about 10 kPa to about 500 kPa), such as from about 110 kPa to about 550 kPa, such as from about 110 kPa to about 500 kPa, such as from about 110 kPa to about 450 kPa, such as from about 110 kPa to about 400 kPa, such as from about 110 kPa to about 300 kPa, such as from about 110 kPa to about 200 kPa, such as from about 150 kPa to about 400 kPa, such as from about 150 kPa to about 300 kPa, such as from about 200 kPa to about 300 kPa, such as from about 200 kPa to about 350 kPa.

Low humidity during deposition and cure of the build material 12 can optionally be utilized to encourage increased penetration depth of the reactive agent and resulting polymer modification. For instance, in one embodiment, the humidity within a deposition chamber 2 can be controlled such that the relative humidity during deposition of the build material is about 1% or less, such as about 0.5% or less, or about 0.4% or less, in some embodiments.

In one embodiment, the thickness of each layer can be controlled to provide sufficiently thin layers and to further encourage penetration of the desired reactions into the layers. For instance, deposition of the build material 12 can be controlled to provide a layer having a thickness of about 5 mm or less, such as about 4 mm or less, about 3 mm or less, about 2 mm or less, or about 1 mm or less, in some embodiments. Of course, thicker layers may also be formed, such as layers of several millimeters or centimeters in depth. For instance, a layer thickness may be selected that in combination with other deposition parameters can ensure that each layer is modified to a desired depth. In one embodiment, layer thickness can be selected so as to ensure that the chemical modification does not extend through the complete layer depth and thereby form functionally graded layers.

Elevated temperatures can also be utilized to control various aspects of a formation process. For instance, temperature of the bed 10, nozzle 14, interior of the deposition chamber 2, or any combination thereof can be selected in combination with one or more of elevated pressure, decreased relative humidity, and layer thickness to control chemical modification depth in each layer, as well as to avoid excessive deposition times. Temperature and deposition speed of the nozzle 14, temperature of the deposition chamber 2, and temperature of the bed 10 during a formation process can also depend upon the particular build material 12 of a formation. By way of example, in one embodiment, a typical 3-D printing nozzle (e.g., about 0.5 mm to about 4 mm diameter nozzle) with deposition pressure controlled at about 60 psi and nozzle temperature set to a temperature of from about 100° C. to about 500° C. can be utilized with the nozzle moving at a speed set from about 1 mm/sec to about 100 mm/sec, the bed temperature can be elevated, such as to a temperature of from about 30° C. to about 150° C., and the temperature within the deposition chamber can be room temperature or above, such as from about 20° C. to about 150° C.

Build products manufactured with the technology described in this disclosure may also undergo traditional pre- and post-processing treatments such as build material additives, heat treatments, and surface treatments.

Build products manufactured with the technology described in this disclosure can exhibit improved characteristics as compared to build products formed of the same materials but absent the reactive agents and modified formation atmosphere, e.g., formed in air at atmospheric pressure and relative humidity. Modified characteristics can include, for instance, color change, mechanical strength, chemical resistance, thermal resistance, electrical conductivity, gloss, fluorescence, scent, or combinations of characteristics.

The present invention may be better understood with reference to the examples, set forth below.

EXAMPLE

PLA pellets (Ingeo™ Biopolymer 4043D) were dried overnight at 60° C. in an environmental chamber. A complete Filabot™ extrusion system which comprised a Filabot™ EX2 using a standard 2.85 mm nozzle, Filabot™ Airpath, and Filabot™ Spooler was used to extrude the dried pellets into a 2.85 mm±0.1 mm filament. Extrusion was performed at 85% of the maximum extrusion speed at a temperature of 180° C. The airpath was set to 100% fan speed. The spooler speed was adjusted for a consistent 2.85 mm±1 mm filament diameter.

A stock Ultimaker™ S2+ connect was outfitted with a third-party enclosure system (Ultimaker™ 2+ Enclosure Kit supplied by Matter Hackers). The enclosure encompassed the open top of the printer. The enclosure was constructed from 3 mm thick aluminum and acrylic windows. Two stainless steel 0.25 in. tubes were installed into the back wall of the enclosure with a 45-degree bend towards the build plate. The tubing bulkhead was comprised of Swagelok® fittings that were externally connected to two separate ozone generators by 0.25 in. flexible tubing. Each ozone generator included an internal pump that pulled air through an external desiccant air dryer (11.125 in.×2 in.) filled with Dry and Dry™ silica gel beads that were maintained at a constant 22° C. temperature and into a corona cell discharge unit. The corona cell power was manually set prior to printing to 100% output (10% to 100% scale) for an expected 0.75 wt. % concentration.

Ozone was flowed into the print chamber at a rate of 3-3.2 standard liter per minute (SLPM) per unit nominal which was measured by an internal flow meter in the ozone generator. An acrylic door was installed onto the front of the Ultimaker™ to maximize ozone containment.

An ozone prefill was performed for 10 minutes prior to the first layer of the print and ozone flow was continued throughout the duration of the print. Printing was performed with the stock Ultimaker™ 4 mm brass nozzle and glass build plate.

Ultraviolet lights were also installed into the printing environment. An Everbeam™ 100 W 365 nm LED array was attached to the ceiling of the enclosure such that the distance to the build plate was 26 cm. 275 nm UV LED strips were attached to the edges of the array. Center wavelengths were measured by to be 370.21 nm and 277.67 nm. UV Light intensity at the center of the build plate was measured by a Thorlabs™ S120VC photodiode power sensor coupled to a Thorlabs™ PM100D optical power meter to be 2.5 mW at 370 nm and 330 11W at 285 nm.

The PLA was printed either in air alone (air+No UV), in air and in the presence of UV (air+UV), or in conjunction with added ozone and in the presence of UV ($O_3$+UV). Printing parameters included a nozzle temperature of 240° C. and a bed temperature of 60° C. The total build size was 0.24 $mm^3$.

Reactions of the PLA with the ozone were understood to include one or more of the following:

modification of the carbonyl group to form a delocalized bond and/or a carboxyl radical

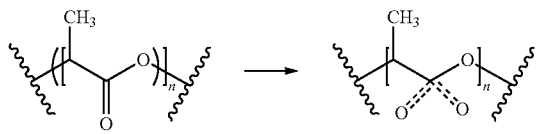

modification of the ester group to a peroxide as follows:

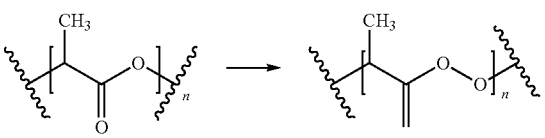

modification of the methyl group to a methanol as follows:

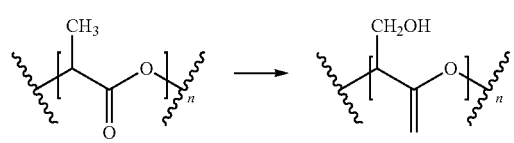

Figure 3:
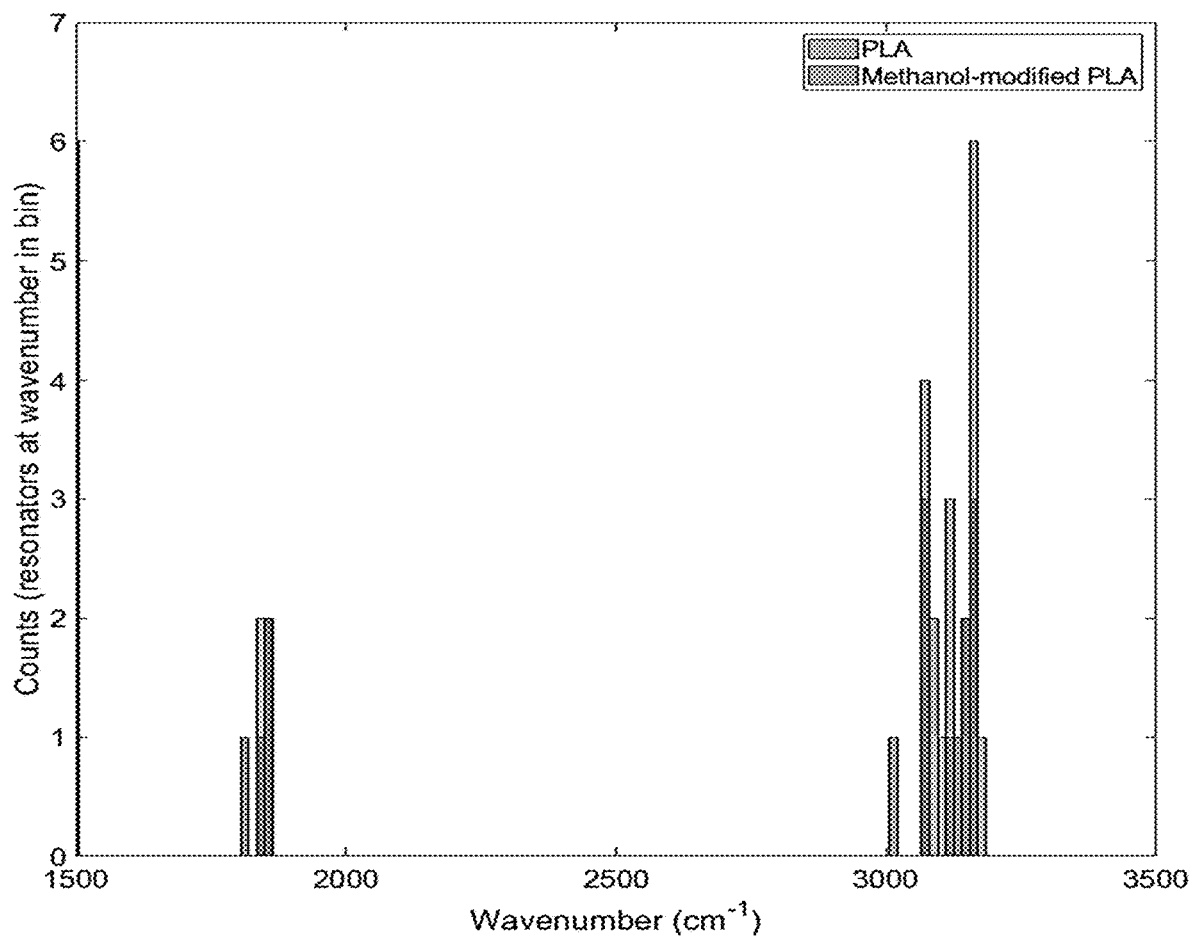
FIG. 3 presents the calculated Fourier Transform Infrared (FTIR) spectroscopy results for a printed polymer and a similar polymer printed under reaction conditions as described.
Figure 4:
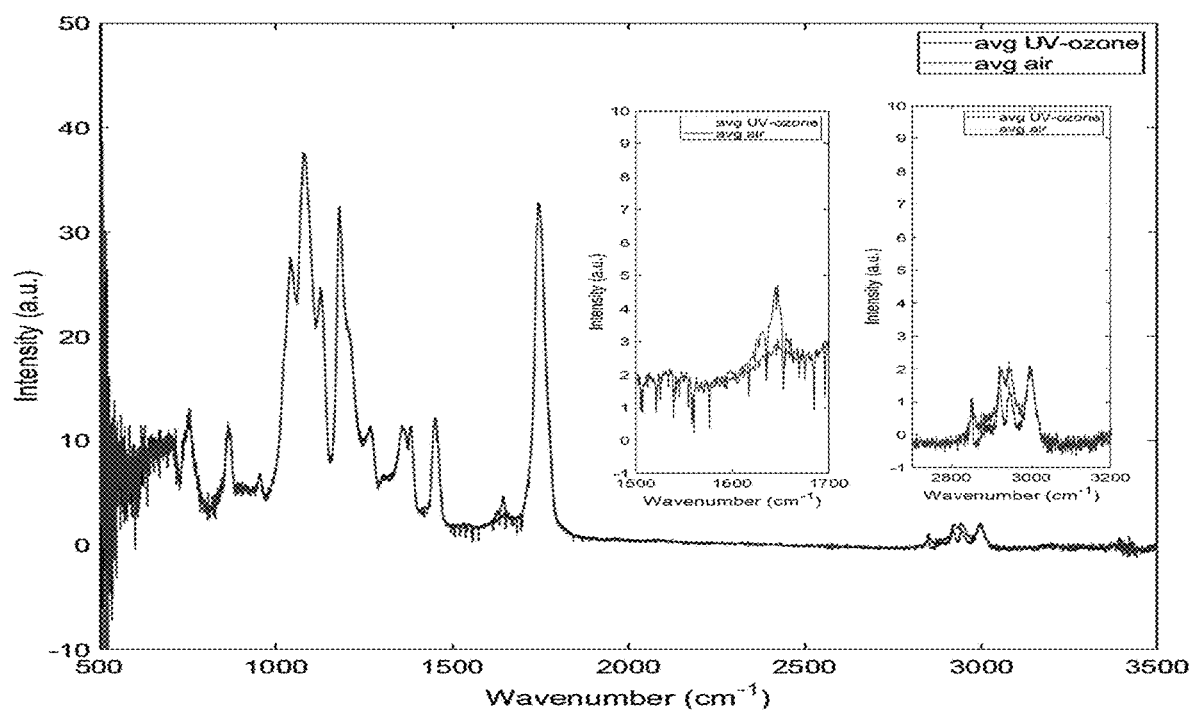
FIG. 4 presents the experimental FTIR spectroscopy results for a printed polymer and a similar polymer printed under reaction conditions as described.

FIG. 3 and FIG. 4 compare the calculated (FIG. 3) and experimental (FIG. 4) FTIR spectrum for a build formed of the PLA as provided and a build that included contact with ozone and UV during formation. As can be seen in the figures, the presence of ozone and UV during the build led to reaction of the methyl group to form a methanol.

While certain embodiments of the disclosed subject matter have been described using specific terms, such description is for illustrative purposes only, and it is to be understood that changes and variations may be made without departing from the spirit or scope of the subject matter.

What is claimed is:

1. An additive manufacturing method comprising:
depositing a first build material from a first deposition nozzle to a surface to form a first layer having a first layer depth, the depositing taking place in a deposition chamber that contains an atmosphere comprising a pressure that is increased above atmospheric pressure by about 7 kilopascal or more;
contacting the first layer with a reactive agent, wherein upon the contact, the reactive agent causes a modification to a chemical structure of a polymer of the first build material, the modification being carried out from a surface of the first layer to a depth of about 300 nm or more of the first layer depth, the modification extending through only a portion of the first layer such that the first layer exhibits a gradation of the modification across the first layer depth, wherein the reactive agent comprises a gas phase reactive agent.

2. The method of claim 1, the method further comprising controlling one or more of a temperature within the deposition chamber, a temperature of a print bed, a temperature of the first deposition nozzle, or a deposition rate within the deposition chamber.

3. The method of claim 1, further comprising depositing a second build material from a second deposition nozzle to the surface.

4. The method of claim 2, further comprising delivering the gas phase reactive agent to the deposition chamber via an inlet.

5. The method of claim 1, wherein the reactive agent further comprises energy.

6. The method of claim 5, wherein the energy comprises a focused beam of energy.

7. The method of claim 5, wherein the energy is provided from a source comprising a laser or an electron gun.

8. The method of claim 5, wherein the energy comprises diffuse energy.

9. The method of claim 5, wherein the energy comprises an electron beam or electromagnetic energy.

10. The method of claim 1, wherein the gas phase reactive agent comprises ozone, hydrogen, ammonia, nitrogen, silicon, sulfur, phosphorous, oxygen, carbon or any combination thereof.

11. The method of claim 1, the modification of the chemical structure comprising formation of noncovalent bonds.

12. The method of claim 1, the modification of the chemical structure comprising formation of covalent bonds.

13. The method of claim 3, wherein upon the deposition of the first and second build materials, the first and second build materials are blended with one another on the surface.

14. The method of claim 3, wherein upon the deposition of the first and second build materials, the first and second build materials are adjacent to one another on the surface.

15. The method of claim 1, the polymer comprising a polyolefin, a polystyrene, a polyurethane, a polyethylene terephthalate, an acrylonitrile butadiene styrene, a glycolyzed polyester, a polycarbonate, a polyamide, a polyetherketone, a biodegradable polymer, a polyphenylsulfone, a halogenated polymer, an elastomeric thermoplastic, or any combination thereof.

16. The method of claim 15, the polymer comprising a poly(lactic acid), a poly(lactide-co-glycolide), or a polycaprolactone.

17. The method of claim 1, wherein the first layer is contacted with multiple reactive agents.

18. The method of claim 17, wherein the contact with the multiple reactive agents causes multiple modifications to the chemical structure of the polymer.

19. The method of claim 1, the modification to the chemical structure of the polymer including one or more of a reaction between the reactive agent and the polymer, a modification of a functional group of a backbone of the polymer, a modification of a pendant group that extends from the polymer backbone, crosslinking of the polymer, formation of a radical on the polymer, or the breaking of a bond on the polymer.

20. The method of claim 1, the atmosphere further comprising a relative humidity that is decreased below that external to the deposition chamber.

* * * * *